United States Patent [19]
Doellinger et al.

[11] 4,389,162
[45] Jun. 21, 1983

[54] ROTOR BLADE COMPRISING A PLURALITY OF INDIVIDUAL SECTIONS

[75] Inventors: Rolf Doellinger, Fischbachau; Rudolf Schindler, Ottobrunn; Dieter Franz, Jettenbach, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 149,523

[22] Filed: May 13, 1980

[30] Foreign Application Priority Data

May 25, 1979 [DE] Fed. Rep. of Germany ....... 2921152

[51] Int. Cl.³ .............................................. F03D 1/06
[52] U.S. Cl. .................................... 416/225; 416/226; 416/229 A
[58] Field of Search ............... 416/230 R, 230 A, 225, 416/132 R, 132 B, 2, 226, 229, 241 A; 244/123

[56] References Cited

U.S. PATENT DOCUMENTS

| 1,879,225 | 9/1932 | Haw | 46/233 |
| 2,254,821 | 9/1941 | Haw | 416/225 |
| 2,734,586 | 2/1956 | Wright et al. | 416/229 |
| 2,869,649 | 1/1959 | Lux | 416/2 |
| 3,108,640 | 10/1963 | Scherenberg | 416/230 A |
| 4,278,401 | 7/1981 | Martinelli | 416/241 A |

FOREIGN PATENT DOCUMENTS 2102803  2/1979  Fed. Rep. of Germany ...... 416/225

Primary Examiner—Louis J. Casaregola
Assistant Examiner—Jeffrey A. Simenauer
Attorney, Agent, or Firm—W. G. Fasse; D. F. Gould

[57] ABSTRACT

A rotor blade, for example for a windmill, comprises a plurality of blade sections between a blade root and a tip. The sections are interconnected by tensioning members such as steel cables or the like, preferably extending through the blade sections. Thus, each section may be manufactured individually and all components may be assembled at the construction site, whereby relatively large windmill rotors may be constructed.

13 Claims, 4 Drawing Figures

ROTOR BLADE COMPRISING A PLURALITY OF INDIVIDUAL SECTIONS

BACKGROUND OF THE INVENTION

The individual sections of sectionalized rotor blades are either individually attached to a spar or they are individually stuck onto the spar and then clamped together as a unit, see German Patent Publication (DE-AS) No. 1,406,443 or French Pat. No. 888,216. These rotor blades are constructed for helicopters, and this prior art aims for a simple production and high elasticity of the rotor blades.

Recently, attempts have been made to produce electricity using wind powered devices. One possibility is to erect a high mast at a prevalently windy location, which mast has a winged rotor with, for example, two rotor blades or wings. The wind driven rotor then drives an electric generator. Some of these blades of such rotors have a length of up to 60 meters and hence, depending on the material used, they weigh up to 20 tons. Known construction principles may only be applied to rotor blades of such dimensions to a limited extent, even if only for the fact that different criteria regarding the elasticity or regarding the strength are given for rotating blades of helicopters or for wind driven devices. Problems in construction, assembly, and operation result for wind driven devices because of the size of the rotor blades.

It has been suggested to manufacture such rotor blades as a single piece using fiber reinforced synthetic materials, since these materials offer advantages with reference to weight and strength. In order to manufacture a rotor blade in this manner, at least a specially built production bench approximately 60 meters long and equally long autoclaves would be necessary, in which the finished rotor blades would be heat cured at temperatures between 100° C. and 250° C.

The transporting and the assembling of such one piece rotor blades or rotor wings of this type is also complicated, simply because of the great length. The rotor blades may have to be mounted on the mast under windy conditions. Accordingly, the wind forces have to be controlled by means of appropriate assembly aids or facilities.

If the construction principle mentioned above for helicopter rotor blades comprising individual sections is used, then the construction of these individual sections may be made easier. However, the assembling of the individual sections on the blade spar which is generally made of tubular steel, the transporting of the finished rotor blade and the mounting of the finished rotor blade on the mast remain complicated.

Finally, a rotor wing of a wind driven device in operation is subjected to extremely high loads. Accordingly, the blade tips of the rotor for example, attain speeds of up to 150 meters per second, the resulting centrifugal forces and also the torsional forces must be taken up completely by the blade material.

OBJECTS OF THE INVENTION

In view of the above it is the aim of the invention to achieve the following objects singly or in combination:

to construct a rotor blade or wing so that even large blades may be simply manufactured and simply mounted;

to construct windmill rotor blades having good mechanical characteristics so that they can take up even the high loads occurring in the operation of a windmill, especially peak loads;

to assemble large windmill rotors at the construction site from individual components whereby the components which are taking up tension loads are initially used as auxiliary equipment for the assembly;

to avoid the use of spar means in the construction of large rotors especially windmill rotors;

to individually adapt the load take-up capacity of the individual blade sections to the loads likely to occur in operation in the particular section, to thereby influence the load capacity of the entire blade;

to control the resonance frequency of the individual blades or wings;

to produce large scale windmill wings in conventional manufacturing facilities;

to construct the blade sections only partially for taking up pressure and/or tension loads whereas secondary, elements of the wings are constructed for that purpose; and to provide bridging members for connecting neighboring blade sections which members provide a plug-in type connection and simultaneously prevent any relative rotation between adjacent blade sections.

SUMMARY OF THE INVENTION

These objects are achieved in accordance with the invention in that each of the blade sections comprises a pressure body having the shape of a spar section extending in the longitudinal direction of the rotor blade, that the pressure bodies of all sections are fitted to one another with a form fit, and in that said pressure bodies of all sections are clamped to one another by means of anchored and adjustable tensioning means which are effective in the longitudinal direction of the blade. The longitudinal direction is the radial direction relative to the rotational axis of the rotor.

A rotor blade according to the invention differs from known constructions, first, in that it does not comprise a self-supporting spar as a structural member of the rotor blade or wing, and secondly, by the connection of the individual blade sections by means of tensioning members, which are tensioned or stretched between adjusting means at tie members at the blade root and fastening points on each of the blade sections to be connected or at intermediate anchors or tie members arranged on the blade sections to be connected. The sections may thus all be clamped together in the simplest manner between the tie members at the blade root and an additional, upper tie member at the blade tip. However, it is preferable that the blades are clamped for example, by means of the mentioned intermediate anchoring members. In this manner, the clamping force for each individual blade section may be individually adjusted. Individual clamping may be used to influence, among others, the strength characteristics of the entire blade, and also, within certain limits, the strength of the individual sections. In this manner, the rotor blade may be optimally adapted to the operational requirements. The characteristic or resonance frequency of the rotor blade depends, for example, also on the mentioned strength properties or characteristics. This characteristic frequency must have a very definite value for a trouble-free operation. This characteristic frequency may already be affected by minor deviations in its structure. Further, it is not completely avoidable, that the finished rotor blade has a slightly different characteristic frequency than the calculated characteristic or resonance frequency. The characteristic frequency of a rotor blade according to the invention may still in spite of such factors as manufacturing tolerances, be adjusted to the desired value by means of appropriately dimensioning of the tensioning means without having to redesign and reconstruct the rotor blade or at least one section of the blade.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
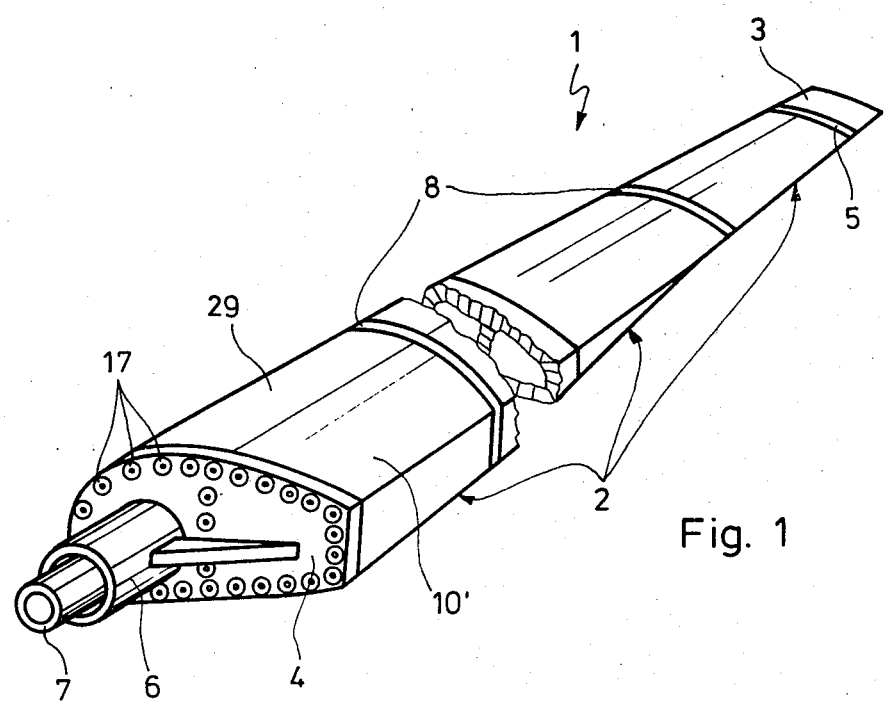
FIG. 1 is a perspective view of a rotor blade according to the invention comprising individual sections.

FIG. 1 illustrates a rotor blade 1 comprising several individual blade or wing sections 2. An end member 3 is provided at the blade tip. The sections 2 are braced together by means of a lower tensioning anchor 4 at the blade root and a tensioning anchor 5 at the blade tip. A tubular bushing 6 is attached to the lower anchor 4. An additional pipe 7 is arranged in the tubular bushing 6. The pipe 7 is connected to a rotor head, not shown. The angle of attack of the rotor blade may be adjusted by means of the pipe 7. The individual sections of the rotor blade either butt directly against one another, as is illustrated in the broken away region of the rotor blade in FIG. 1, or intermediate anchors 8 are provided between two adjacent sections. The connection between sections, or between the sections and the intermediate anchors 8 are form-fit connections. The sections of the rotor blade are stayed or braced or clamped between the tie anchors 4 and 5 or between the intermediate anchors 8 as will be described below.

Figure 2:
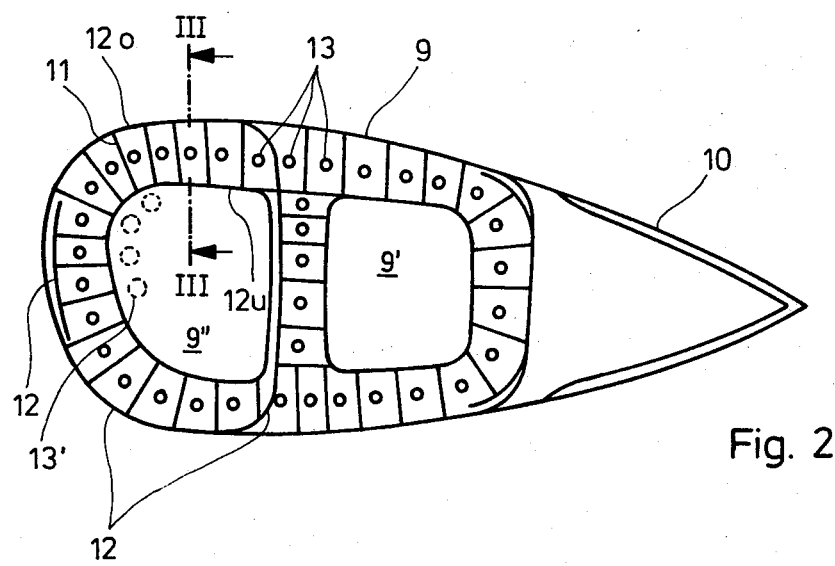
FIG. 2 represents a cross-section through the rotor blade perpendicularly to the longitudinal or radial axis of the blade.

The sections 2 of the rotor blade are substantially so-called sandwich type structures, as is illustrated schematically in FIG. 2. The section 2 of the rotor blade has a two-chamber pressure body 9, enclosing chambers 9' and 9''. The blade edge 10 is cemented to the pressure body 9 by conventional adhesives or any suitable bonding technique. The pressure body 9 comprises support cores 11 which are joined together and cemented to each other. The support cores 11 are reinforced with laminates 12 of fiber reinforced synthetic material which is known as such and hence does not need to be explained in more detail. Guide channels 13 are placed in the support cores 11 and then the remaining space in the support cores is, for example, foam filled. The support cores 11 may be sections of fiber reinforced synthetic materials with unidirectionally arranged fibers. However, metal frames and the like may also be suitable.

Figure 3:
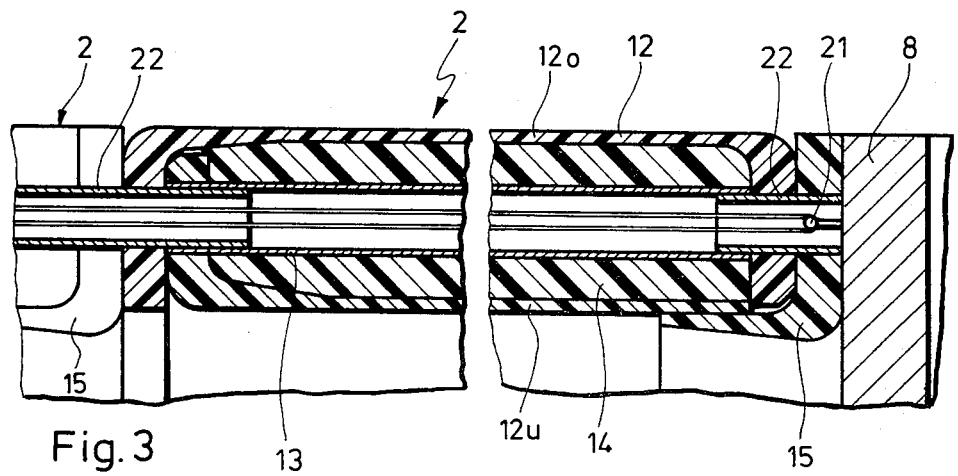
FIG. 3 shows a longitudinal sectional view through a portion of a blade section along section line III—III in FIG. 2.

In place of filling the support cores, the space between the laminates 12 may also be filled with synthetic resin, wherein the guide channels 13 are then installed directly into the synthetic resin. An embodiment of this type is illustrated in FIG. 3. In this instance, the upper laminate in the form of an outer shell 12o and the lower laminate in the form of an inner tubular member 12u form together a torsion shell having end flanges as best seen in FIG. 3. The guide channel 13 is installed in the torsion shell and the remaining space 14 in the shell is filled with foam. The end surfaces of the individual sections 2 are flat flanges, as is shown in FIG. 3. At least one end cap 15, which is also made of fiber reinforced synthetic materials may be used for holding the inner tubular member 12u and the other shell 12o as illustrated in FIG. 3. The end caps 15 are cemented to the torsion shells by a conventional adhesive suitable for this purpose. Thus, the blade sections 2 are individually replaceable for maintenance or repair.

Clamping or tensioning members 16, which are for example, also made of fiber reinforced synthetic materials, with high tensile strength extend in the guide channels 13. These members 16 may be made of other materials such as steel wires, steel cables, or steel laminates. In the present example embodiment, fiber materials are used for the tensioning members 16 which are loop shaped. One end of the loop is attached to an adjusting member 17 on the lower tie anchor 4. Threaded spindles, pulley members or toggle levers, etc., may be used for the adjusting members 17.

Figure 4:
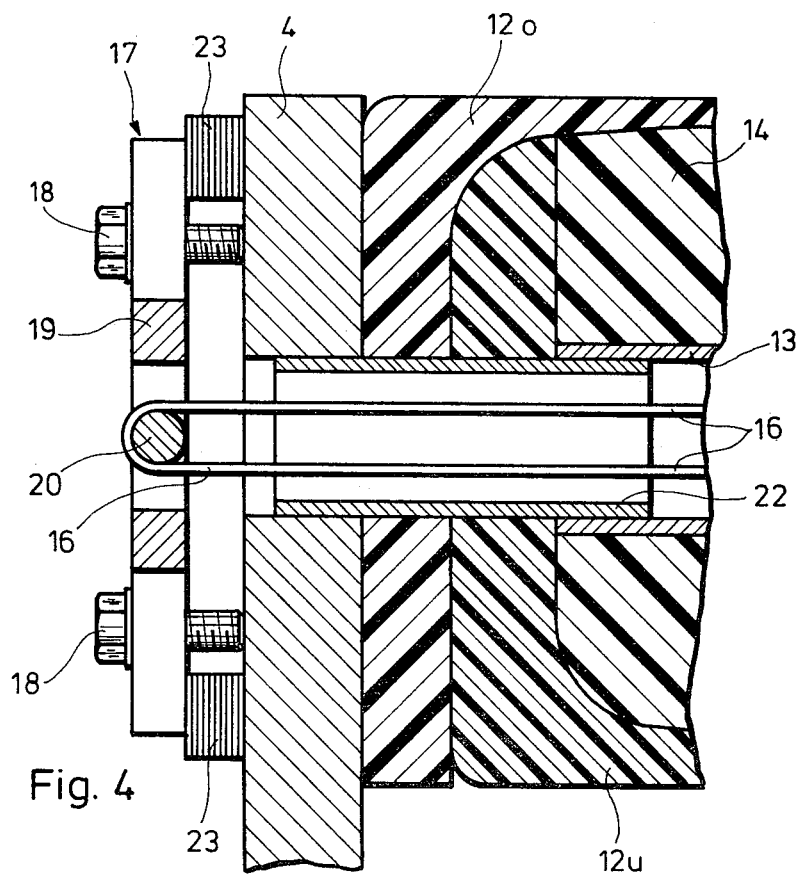
FIG. 4 is a partial section through a tie or anchor member with a clamped blade section for a rotor blade according to the invention.

In the example embodiment of FIG. 4, a tension plate 19 is used which may be adjusted by means of adjusting screws 18. The tension plate 19 carries a bolt 20 around which the loop of the tensioning member 16 is placed. The adjusting screws 18 are supported against the tie anchor 4. The other end of the tensioning member 16 is placed around a support bolt 21, which is either connected to an end cap 15 of one of the blade sections 2 as is seen in FIG. 3, or the support bolt 21 may be connected to an intermediate flange 8. Since the tensioning members 16 form endless loops which run around said bolts 20, 21, these loops 16 are also individually replaceable for maintenance or repair. By spacing the bolts 20, 21 as shown in FIG. 3 so that a tensioning loop interconnects at least two adjacent blade sections 2, these loops may be used as aids in the assembling of the sections into a blade. Locking means in the form of connecting bushings 22 are provided at each of the contact points between the individual blade sections 2 or between the individual blade sections and any intermediate flanges such as anchors 8 for preventing any rotation of the blade sections relative to each other about the longitudinal blade axis which extends radially relative to the rotational axis of the blade.

The guide channels 13 of two neighboring blade sections are connected to each other by means of these connecting bushings 22. These connecting bushings 22 also extend through the intermediate flanges or anchors 8 if a tensioning member 16 is not secured at this point and there is only a connection to the following rotor blade section. The connecting bushings 22 secure, at the same time, the form fit or force transmitting fit between the blade sections 2 or between the blade sections 2 and the intermediate flanges or anchors 8. Furthermore, the sections 22 transfer the shearing forces between the individual blade sections and take up any torsional loads on the blade in operation. In place of the connecting bushings 22 the channels 13 could be extended beyond the blade section or beyond the intermediate anchors 8 and serve to take up torsional loads. Other constructions could be used for this purpose. For example, the face ends of the rotor blade sections and of the intermediate flanges or anchors 8 could be toothed or indented. However, this requires high production costs.

The individual rotor blade sections 2 are connected, in the embodiment shown, by means of a plurality of tensioning members 16 passing longitudinally through the blade sections 2. The tension of the tensioning members 16 is adjustable by adjusting members 17 for example in the form of adjusting screws 18, shown in FIG. 4. The tensioning members 16 pass through the connecting bushings 22 as shown in FIGS. 3 and 4.

The individual sections 2 could simply be clamped between the lower and the upper tensioning anchors 4 or 5 respectively, without an intermediate anchoring member or flange 8. This depends on the strength requirements and other required characteristics of the rotor blade. In this instance, homogeneous clamping forces across or rather along all blade sections 2 result. These clamping forces may be affected within certain limits only by the structural shape, especially the profile section, of the sections 2. However, if intermediate anchors 8 are provided, then the clamping force for the individual sections 2 may be adapted to the respective individual requirements. The characteristic frequency of the rotor blade, for example, is also affected or determined by additional tensioning members. The characteristic or resonance frequency must be set at a particular value for a trouble-free operation.

A rotor blade constructed in accordance to the invention makes it possible to vary the characteristic frequency by means of appropriate characteristic tensioning members of the individual sections of the rotor blade, hence, the characteristic frequency may be adjusted to an optimal value. Other characteristic values, such as the strength of the blade in certain regions, may also be varied by means of the individual clamping of the sections, whereby said strength may be optimally adjusted to the individual requirements. In any case, the clamping or tensioning force of the members 16 must be greater than the maximum loading of the rotor blade due to the centrifugal force and bending moments. The load on the adjusting members 17 may be relieved after adjustment of the clamping force for the tensioning members 16, for example, by wedges 23 introduced beneath the tension plate 19. These wedges 23 take up the clamping force so that the load on the adjusting screws 18 is removed in the tensioned condition of the members 16.

The guide channels 13 for the tensioning members 16 of the illustrated example embodiment are located inside the sandwich type structure of the rotor blade. It is also possible, in the instance of smaller rotor blades with narrow wall thicknesses, to arrange the guide channels for the tensioning members in the inner chambers 9', 9" of the pressure bodies 9. This is illustrated schematically in FIG. 2 by means of guide channels 13' indicated by dotted lines. In special instances, the tensioning members 16 may, for additional strength of the blade, be arranged outside the blade contour in a region which does not interfere aerodynamically; additional lift may also be gained through these means.

It is also noted that the cross section of the rotor blade does not need to have the same shape as the shape illustrated in FIG. 2, over the entire length of the blade. It may be seen from FIG. 1 that the blade tapers toward the blade tip 3, wherein the first section 2 has a flush rear surface, and only the sections in the radially outer region of the rotor blade have a blade edge as illustrated at 10 in FIG. 2. The shape of the rotor blades and the distribution of the load carrying pressure bodies 9, and the distribution of secondary members such as blade edges 10 or the like which are not loaded in the tension or the compressive direction, depends on the requirements to be met by the rotor blade during operation. Thus, it is possible that the pressure member, for example, is constructed simply as a single chamber, and that also the tie anchors 4 and 5 only cover this region of the blade. The leading edge or portion of the rotor blade of FIG. 1 is designated by 29. This portion 29 is constructed as a pressure body. The rear portion or trailing edge designated by 10' comprises secondary members which are not subjected to tensile or compressive loads. The tie anchors 4 and 5 and the intermediate anchors 8 extend across the entire blade cross section, wherein adjusting members 17 may also be provided in the region of the secondary members 10' on the tie anchors 4, 5, whereby the associated tensioning members 16 extend outside the pressure members 29 as is described above.

The rotor blade tapers toward the blade tip 3 as mentioned. Therefore, the guide channels 13 for the tensioning members 16 follow substantially the outer contour of the rotor blade and thus the guide channels 13 do not run parallel but converge toward the tip thereby forming as a whole, a slightly conically extending bundle. Accordingly, the tensioning members (16) also do not extend in parallel but rather they extend with a certain, small acute angle to one another and relative to the longitudinal rotor blade axis. This has the advantage that also buckling loads acting on the rotor blade are taken up by the tensioning members 16.

The described rotor blade may be assembled and mounted directly at the installation site. For this purpose, the rotor head, which is not shown here, with the tube 7, the tubular bushing 6, and the tie anchors 4 are first mounted to the mast. The individual blade sections 2 may then be raised by means of the tensioning members 16 and if necessary clamped to the intermediate anchors 8. The passageways for the tensioning members 16 at the tie anchors or at the blade sections and the intermediate anchors, for example, in the region of the connecting bushings 22, may be coated with a glide surface of polytetrafluoroethylene in order to reduce possible frictional forces between the tensioning members and these passageways or guide channels during the raising.

Rotor blades with large dimensions may also be manufactured in already existing factories if they are constructed according to the invention and these rotor blades may be assembled or mounted at relatively low costs.

Blade sections of blades with sizes of 60 meters have lengths between approximately 6 and 12 meters which can be handled in existing factories. Sections with such lengths may be manufactured from fiber reinforced synthetic materials with known technological methods, and they may also be heat hardened or cured in existing autoclaves to improve their strength properties.

The rotor blade is only loaded tensionally and compressively by means of the clamping forces and centrifugal forces, and torsionally by aerodynamic forces. Consequently, the blade sections are preferably constructed as sandwich type components comprising a core profile coated with laminates of fiber reinforced synthetic materials with a uniform fiber direction, namely, in the direction of tension or compression.

However, other structures using other materials are possible, for example, synthetic resin constructions are suitable using inexpensive filler materials, such as asbestos cement, gas filled or aerated concrete constructions, or metal constructions, as long as the criteria for compressive strength are satisfied. The core profile may, for example, comprise mutually connected rectangular steel pipes or it may be made of fiber reinforced synthetic materials. The core may be foam filled. It is also possible to construct the sections in the shape of foam filled torsion shells. It is sufficient to construct but one portion of the cross section of the blade sections as bodies capable of taking up tension and compression caused by clamping and centrifugal forces. The other contour forms of the rotor blade, for example the blade edges, may be constructed as secondary, non-load carrying portions. Such secondary structures are known, and hence need not be further explained.

The tensioning members 16 which are preferably arranged in guide channels 13, 13' may extend within the mentioned sandwich type construction. These guide channels are inserted or imbedded in foam during the manufacturing of the blade sections. If the wall strength of the blade sections is not sufficient for this type of embedding, then the guide tubes may be placed inside the chambers 9', 9" of the rotor blade. The guide channels of neighboring blade sections are connected to one another by means of insertable bushings which simultaneously serve to prevent the blade sections from rotating relative to each other.

A rotor blade according to the invention may be simply produced, simply transported, and simply installed. It is particularly advantageous during transporting and mounting, that only parts of manageable length and hence also manageable weight need to be handled.

Although the invention has been described with reference to specific example embodiments, it is to be understood that it is intended to cover all modifications and equivalents within the scope of the appended claims.

What is claimed is:

1. A large scale rotor blade having a longitudinal, radially extending axis, comprising a plurality of individual blade sections (2) forming pressure bodies extending in the longitudinal, radial direction of the rotor blade axis, each blade section having an end surface which forms an interface with an end surface of the adjacent blade section in an end to end fitting relationship, tensioning means (16) extending longitudinally relative to said individual sections for providing a pulling force which holds the individual sections together, anchoring means (20, 21) securing both ends of said tensioning means, said anchoring means and adjacent blade sections providing an exclusively form-fit connection between adjacent blade sections (2), adjustment means (17, 18) operatively connected to one end of said tensioning means for adjusting said pulling force applied by said tensioning means to operatively hold all individual sections of the rotor blade together, whereby said individual sections may be assembled to form large blades, said rotor blade further comprising a plurality of bushings (22) extending through each interface to form locking means (22) which together prevent any rotation of said blade sections (2) relative to one another about said rotor blade axis, and wherein said tensioning means (16) extend through said bushings (22) at a small, acute angle relative to the longitudinal rotor blade axis.

2. The rotor blade of claim 1, further comprising a blade root and a blade tip, said individual sections (2) being operatively interposed between said blade root and said blade tip, said anchoring means comprising intermediate anchor means (8) operatively interposed between adjacent individual sections, said blade root comprising a radially inner tie member (4), said blade tip comprising a radially outer tie member, said adjustment means securing said tensioning means at one end thereof to said radially inner tie member of the blade root, said anchoring means further comprising securing means (21) for securing the other end of said tensioning means to any one of said individual blade sections, said intermediate anchor means, and said radially outer tie member of said blade tip, said rotor blade further comprising load relief means (23) operatively interposed between said adjustment means (17) and said radially inner tie member (4), whereby, after adjustment of the tension, the adjustment means may be relieved of the tension.

3. The rotor blade of claim 1, wherein said adjustment means (17) comprise threaded spindles (18).

4. The rotor blade of claim 1, wherein said tensioning means comprise loop belts (16) made of fiber reinforced synthetic materials including unidirectionally arranged fibers.

5. The rotor blade of claim 1, further comprising channel means extending longitudinally through the rotor blade, said tensioning means being located in said channel means.

6. The rotor blade of claim 5, wherein said channel means comprise guide channels (13) extending at a small acute angle relative to the longitudinal axis of the rotor blade (1) and wherein said guide channels (13) converge longitudinally outwardly of the rotor blade (1).

7. The rotor blade of claim 6, wherein said bushing means (22) extend with a sufficient length through each interface for operatively interconnecting the guide channels (13) of neighboring blade sections (2).

8. The rotor blade of claim 1, wherein said individual sections (2) of the rotor blade (1) comprise a sandwich type construction including a core (11) and fiber reinforced synthetic laminates (12) arranged over said core (11).

9. The rotor blade of claim 8, wherein said tensioning means extend in the core (11) of the blade sections (2).

10. The rotor blade of claim 8, further comprising guide channel means for said tensioning means, said guide channel means (13) for the tensioning means being arranged in the core of the sandwich type construction of the rotor blade.

11. The rotor blade of claim 10, wherein said guide channel means (13') are arranged in inner chambers of the individual sections which are built as sandwich type constructions.

12. The rotor blade of claim 1, wherein said tensioning means comprise endless loops (16) and bolts (20, 21) positioned and spaced so that a loop (16) interconnects at least two adjacent blade sections, whereby these loops may be applied as assembly aids during the assembling of the rotor blade.

13. A large scale rotor blade having a longitudinal, radially extending axis, comprising a plurality of individual blade sections (2) forming pressure bodies extending in the longitudinal, radial direction of the rotor blade axis in an end to end fitting relationship, tensioning means (16) extending longitudinally relative to said individual sections for providing a pulling force which holds the individual sections together, anchoring means (20, 21) securing both ends of said tensioning means, said anchoring means and adjacent blade sections providing an exclusively form-fit connection between adjacent blade sections (2), adjustment means (17, 18) operatively connected to one end of said tensioning means for adjusting said pulling force applied by said tensioning means to operatively hold all individual sections of the rotor blade together, whereby said individual sections may be assembled to form large blades, said rotor blade further comprising locking means (22) for preventing any rotation of said blade sections (2) relative to one another about said rotor blade axis, and wherein said tensioning means (16) extend at a small, acute angle relative to the longitudinal rotor blade axis, wherein said individual rotor blade sections (2) forming pressure bodies comprise an outer shell (12o) of fiber compound material having radially inwardly directed end flanges and an inner tubular member (12u) having at least one radially outwardly directed flange and fitting into said outer shell (12o), and wherein said tensioning means comprise endless loops (16) and bolts (20, 21) around which said endless loops run, whereby the tensioning means and said pressure bodies of the rotor blade are constructed to be individually replaceable for the purpose of maintenance and repair.

* * * * *